(12) United States Patent
Fusco

(10) Patent No.: US 6,685,408 B1
(45) Date of Patent: Feb. 3, 2004

(54) BOLT WITH SWIVEL CATCH

(76) Inventor: Pasquale Fusco, 8 Marlborough Road, Wootton Bassett, Swindon, Wiltshire SN4 7EJ (GB)

( * ) Notice: Subject to any disclaimer, the term of this patent is extended or adjusted under 35 U.S.C. 154(b) by 0 days.

(21) Appl. No.: 09/914,688

(22) PCT Filed: Mar. 6, 2000

(86) PCT No.: PCT/GB00/00794

§ 371 (c)(1),
(2), (4) Date: Nov. 19, 2001

(87) PCT Pub. No.: WO00/52345

PCT Pub. Date: Sep. 8, 2000

(30) Foreign Application Priority Data

Mar. 4, 1999 (GB) .............................................. 9904883

(51) Int. Cl.$^7$ ................................................ F16B 21/00
(52) U.S. Cl. ........................ 411/344; 411/340; 411/345
(58) Field of Search ................................ 411/340, 344, 411/345, 346

(56) References Cited

U.S. PATENT DOCUMENTS

| 644,115 | A | * | 2/1900 | Waterman et al. | .......... 411/344 |
|---|---|---|---|---|---|
| 1,075,759 | A | | 8/1912 | Burridge | |
| 1,340,470 | A | * | 5/1920 | Whitmore | .................... 411/345 |
| 1,346,578 | A | | 7/1920 | Windsor | |
| 2,224,522 | A | * | 12/1940 | Peterson | ...................... 411/340 |
| 2,578,515 | A | * | 12/1951 | Crafton | ...................... 411/340 |
| 2,758,498 | A | | 8/1956 | Johnson | |
| 4,739,543 | A | | 4/1988 | Harris, Jr. | ..................... 24/297 |

FOREIGN PATENT DOCUMENTS

| DE | 51544 | | 4/1890 | |
| GB | 222904 | | 10/1924 | |
| GB | 552100 | | 3/1943 | |
| GB | 554416 | * | 7/1943 | ................. 411/340 |
| WO | 9310316 | | 5/1993 | |

* cited by examiner

Primary Examiner—Neill Wilson
(74) Attorney, Agent, or Firm—Robert W. J. Usher

(57) ABSTRACT

A fastener comprises a shank 10 for extending through an opening 60 from a near side 56 to a far side 58 of a wall and a catch 20 retained In the shank of the fastener, in which the catch has first and second orientations in which, respectively, it projects less and more beyond the profile of the shank, whereby the catch can pass through the opening in the first orientation but the catch engages the far side of the wall and prevents withdrawal of the shank from the opening in the second orientation, the catch being supported by a shoulder 42 when the shank is tensioned by a nut 50. Swivelling of the catch is controlled by rotation of the shank.

12 Claims, 2 Drawing Sheets

BOLT WITH SWIVEL CATCH

FIELD OF THE INVENTION

This invention relates to fasteners, and in particular to fasteners suitable for fixing into a wall or other panel by passing though an opening in the wall and extending a catch member to prevent subsequent withdrawal, when access is restricted to one side of the wall.

SUMMARY OF THE INVENTION

A number of fastener designs of this general kind are known. The present invention has one object to provide an improvement in such designs, and in certain embodiments to provide a fastener which can withstand large withdrawal forces without damage, and also to provide a fastener which can be withdrawn even when there is no access to the catch mechanism.

Generally, this invention is concerned with a fastener comprising a shank for extending through an opening from a near side to a far side of a wall and a catch retained in the shank of the fastener, in which the catch has first and second orientations in which, respectively, it projects less and more beyond the profile of the shank, whereby the catch can pass through a suitably sized opening in the first orientation but the catch engages the far side of the wall and prevents withdrawal of the shank from the opening in the second orientation. Means are suitably provided for tensioning the shank in the opening by reaction against the near side of the wall.

In certain embodiments of the invention, the catch may be adapted to swivel from the first orientation to the second orientation, and/or from the second orientation to the first orientation, by means of gravity. In some embodiments of the invention, the catch may rely on the sides of the opening to retain it in the first orientation while the shank is inserted in through the opening. In some embodiments, it may not be possible to return the catch from the second orientation to the first orientation, but, especially in cases where the fastener is not being inserted vertically through an opening, the catch may be arranged to swivel under the action of gravity when the shank is rotated in the opening, according to the rotary position of the shank.

In a preferred embodiment, the catch may comprise a retaining arm mounted in the shank of the fastener, movable between a first orientation in which it lies substantially wholly within the profile of the shank, and a second orientation in which it extends beyond the profile of the shank, whereby it can engage the far side of the wall when the fastener is subjected to tension forces tending to withdraw it from the opening.

In particular preferred embodiments of the invention, the shank is provided with an abutment supporting the catch in its second orientation.

The shank may be provided with a slot extending diametrically through the shank. The arm may be swivel mounted on a pin extending across the slot. The aforesaid abutment may be formed by a shoulder at one end of the slot.

The catch may be adapted to pivot on an axis that is offset from its centre of gravity. In certain embodiments, intended for fixing the fastener with its shank vertical, the centre of gravity of the catch is offset from the pivot axis in a direction radially outwardly of the longitudinal axis of the shank when the catch is in its first orientation, contained within the profile of the vertical shank, so that gravity tends to turn the catch and swivel it into its second orientation. In other embodiments, intended for use with the shank horizontal, the centre of gravity of the catch may be displaced from its pivot axis in a direction parallel to the longitudinal axis of the shank, so that gravity tends to swivel the catch into its second orientation when the fastener is inserted horizontally through an opening. The centre of gravity may be offset both axially and radially of the shank to enable the fastener to be used in a variety of orientations, and in particular also to enable the catch to be switched between the first and second orientations by rotating the fastener on its longitudinal axis.

The movement of the retaining arm is desirably restricted by abutments or other means in order to permit it to swivel from the first orientation to the second orientation in one direction only, and/or to swivel from the second to the first orientation in one direction only, normally the opposite direction. By limiting the freedom of the swivel arm to rotate, it can more easily be controlled.

The tensioning means may comprise nut means in screw threaded engagement with the shank. Other means having equivalent effect may equally be used.

The fastener may be provided with marking whereby the orientation of the shank may be indicated, even when the part of the shank holding the catch is invisibly contained in or beyond the opening, so that a user can more conveniently control the orientation of a gravity operated catch by appropriately turning the fastener in the opening. Such marking may be on an end of the shank directed, in use, towards the near side of the wall.

BRIEF DESCRIPTION OF THE DRAWINGS

Two embodiments of the invention are illustrated, by way of example, in the accompanying drawings, in which.

DETAILED DESCRIPTION OF THE INVENTION

The illustrated fasteners are constructed entirely of steel, for strength. In the illustrations of the first embodiment, FIG.

1 shows the shank 10 which consists of a steel rod having threads 12 on one end and slot 14 cut diametrically through the shank between the threaded potion of the rod and its far end. The end face of the threaded end of the shank is diametrically incised to form a groove 16 aligned with the slot, so that the orientation of the groove indicates the orientation of the slot. A suitable marker is applied at one end of the groove, as an indication of which way up the fastener shank is lying, to distinguish between the positions shown in FIGS. 3 and 4.

Figure 2:
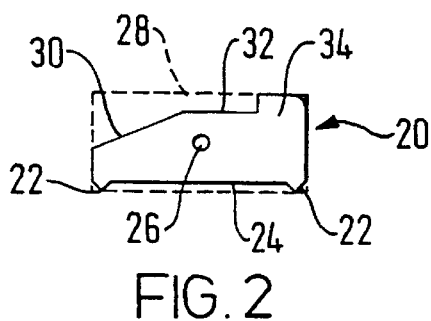
FIG. 2 is a side elevation of a catch for the fastener.

FIG. 2 shows a catch 20, formed from a small steel plate of a width just less than the width of slot 14. A dashed outlined indicates a rectangular shape to the plate from which material has been removed to form the catch, and on which a pair of nibs 22, one on each end of the bottom edge 24 of the catch, have been formed. An aperture 26 for a pivot pin is provided through the plate centrally of the rectangular outline. The top edge 28 of the rectangle has been removed by an angled cut at one corner to leave an inclined edge portion 30, and a central part in the region of the aperture 26 has been removed to a lesser extent to reduce weight and form a flat abutment portion 32. The top corner opposite the inclined edge portion 30 has been retained to form an ear 34 to increase the weight differential between the two ends of the catch. These two ends form arms which, each with its nib 22, may take up positions inside or outside of the profile of the shank according to the orientation of the catch.

As compared with the original rectangular outline, and dividing the catch by notional horizontal and vertical lines through the pivot aperture 26, the lower half of the catch is heavier than the upper half, and the arm with the ear 34 is heavier than the arm with the inclined edge portion 30, so that as seen in FIG. 2, the centre of gravity of the catch is in the lower right hand quadrant.

Figure 3:
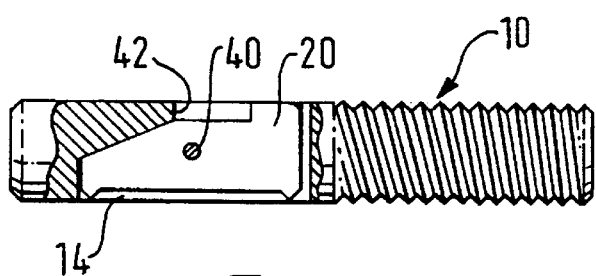
FIG. 3 is a diagrammatic side view of the shank with a near side of the slot cut away to show the catch in a first orientation in the slot, contained wholly within the profile of the shank.
Figure 4:
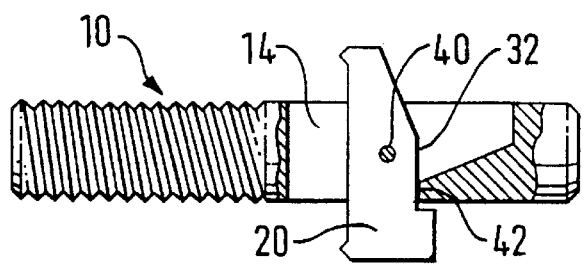
FIG. 4 is a view corresponding to FIG. 3 but with the shank turned 180° on its axis to invert it, allowing the catch to turn 90° to a second orientation in which it extends beyond the profile of the shank.

FIG. 3 shows how the catch is mounted in shank 10 by pivot pin 40 in slot 14, which corresponds in shape substantially to the outline of catch 22, except where additional material of the shank is removed in order to allow the catch to pivot on pin 40 from the position shown in FIG. 3 to the position shown in FIG. 4. In particular, the slot is shorter at its upper opening than at its lower opening, as a result of conforming to the inclined edge portion 30 of the catch. Where the correspondingly inclined end of the slot emerges on the top of the shank, there is an abutment formed by a shoulder 42 which bears against the flat abutment portion 32 of the catch when the shank is inverted and the catch swings into the position shown in FIG. 4.

It will be appreciated that, when the shank is as shown in FIG. 3, gravity tends to turn the catch clockwise and the catch is therefore retained in the slot wholly within the profile of the shank by the abutment of inclined edge portion 30 with the correspondingly shaped end of the slot. However, when the shank is turned axially through 180° to the inverted position shown in FIG. 4, gravity turns the catch to the position there shown. Rotation of the shank through another 180° will of course return the catch to its FIG. 3 orientation.

Figure 5:
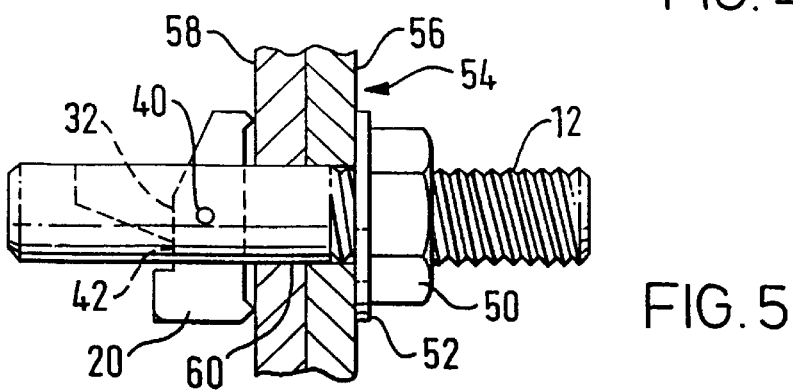
FIG. 5 is a diagrammatic side view showing the complete first fastener assembled through an opening in a wall.

In use, as shown in FIG. 5, a nut 50 is applied to the threaded end of the shank, preferably following a washer 52. A wall 54 is illustrated, comprising a near panel 56 and a far panel 58 with a continuous opening 60 through both wall panels, drilled to allow the shank of the fastener to pass through from the rear side to the far side. This is done with the shank of the fastener in its FIG. 3 orientation, so that the catch does not contact the opening. The fastener is then rotated on its axis 180° so that the catch swivels into its second orientation, nibs 22 facing the far wall panel 58. The shank is then withdrawn until the catch abuts the wall, whereupon nut 50 can be tightened to achieve the fastened arrangement shown in FIG. 5. Groove 16 can be used as a screwdriver slot to turn the shank, and to hold it while nut 50 is tightened. A very substantial torque can be used on the nut, without overstressing the pivot pin 40, because of the support provided by the shoulder 42 pressing against the flat abutment portion 32 of the catch.

The fastener can be withdrawn from the opening 60 by reversing the installation procedure, that is to say by slackening the nut 50, pushing the fastener shank further into the opening, rotating 180° to drop the catch into the slot, and withdrawing the shank from the opening.

The second exemplary embodiment of the invention is illustrated in FIGS. 6 to 10 which are views corresponding to FIGS. 1 to 5 respectively. Comparison of the corresponding drawings will show the modifications that are incorporated into this second embodiment. The following description will concentrate on the differences between the two embodiments, and if no change to a feature of the fastener is mentioned, that feature may be assumed to be unchanged.

Figure 1:
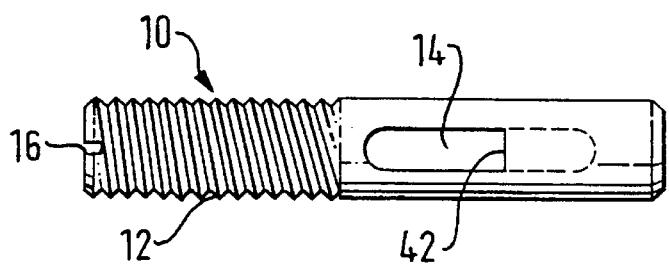
FIG. 1 is a plan view of the shank of a first fastener according to the invention, showing a slot in which a catch can be mounted.
Figure 6:
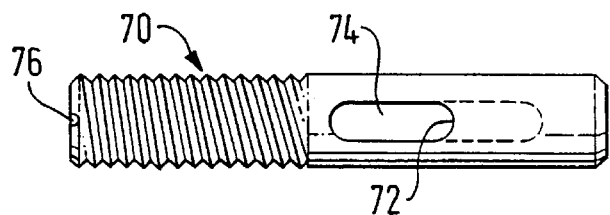
FIG. 6 is a plan view of the shank of a second fastener according to the invention, showing a slot in which a catch can be mounted.

The fastener of the second embodiment has a shank 70 in which the flat, square shoulder 42 shown in FIG. 1 is replaced, for ease of manufacture, with a rounded concave shoulder 72 as shown in FIG. 6. The orientation of slot 74 (corresponding to slot 14) is shown by a simple depression or punch mark 76 on the threaded end of the shank.

Figure 7:
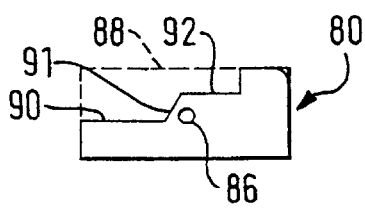
FIG. 7 is a side elevation of a catch for the second fastener.

Catch 80, as seen from the viewpoint shown in FIG. 7, has a greater weight bias towards the bottom half and towards the right hand half of the notional rectangular outline 88 into which it fits, and at the centre of which a pivot pin aperture 86 is located. This is achieved by omitting the nibs 22 of catch 20, replacing inclined edge portion 30 by flat portion 90 and inclined transitional portion 91, and by moving abutment portion 32 closer to the axis of the fastener, as abutment portion 92.

Figure 8:
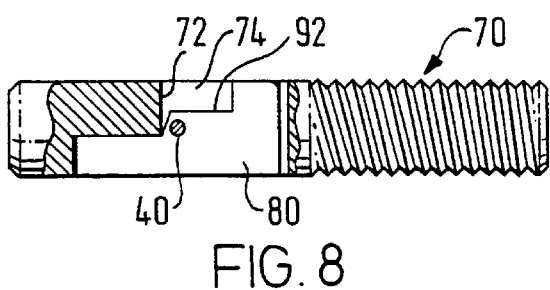
FIG. 8 is a diagrammatic side view of the shank with a near side of the slot cut away to show the catch in a first orientation in the slot, contained wholly within the profile of the shank.
Figure 9:
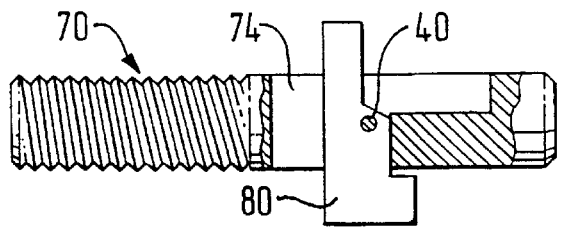
FIG. 9 is a view corresponding to FIG. 8 but with the shank turned 180° on its axis to invert it, allowing the catch to turn 90° to a second orientation in which it extends beyond the profile of the shank.
Figure 10:
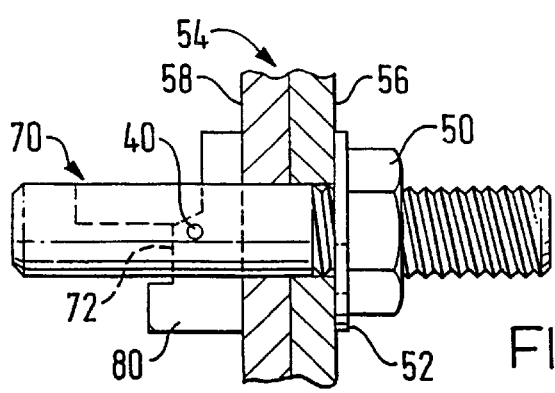
FIG. 10 is a diagrammatic side view showing the complete second fastener assembled through an opening in a wall.

FIGS. 8, 9 and 10 show that the action of the fastener is unchanged in principle, but that slot 74 has an internal shape that is adapted to the shape of catch edge portions 90, 91 and 92. In particular, the abutment formed by shoulder 72 is longer than in shoulder 42, which enables the forces experienced between the abutment portion 92 of the catch and the shoulder 72 to be distributed over a larger area, especially if the surface shape of portion 92 is curved to match shoulder 72.

The absence of nibs 22 also allows a greater area of force distribution between catch 70 and wall panel 58. Larger force distributions imply lower local pressures, which may be beneficial in terms of increasing the range of materials that can be used or fastened, or allowing higher forces to be used.

The same pivot pin 40 is used in the two embodiments. It should be noted that this pin transmits negligible force during operation of the fastener. As shown in FIGS. 5 and 10, when the fastener is tightened by means of the nut 50 to grip the panels 56, 58 of wall 54 between the catch and washer 52, pin 40 becomes redundant. Catch 20 is pressed against the wall by shoulder 42 of shank 10, and catch 80 is pressed against the wall by shoulder 72 of shank 70. The purpose of pin 40 is to hold the catch in place in its slot while allowing it to swivel through approximately 90°, and It may suitably be made of a self-lubricating plastics material such as a polyamide, and preferably one that is flexible and resilient, so that any distortion is less likely to be permanent and stiffen the action of the catch.

Similar fasteners can be used in vertical orientations. According to whether the fastener is intended to be inserted upwardly or downwardly, the two ends of the slots 14, 74 and the catches 20, 80 can be as shown or reversed. The balance of the catches can be adapted as well, by altering the positions of the pivot pin apertures 26, 86, or extending the length of either end. When the fastener is inserted vertically, the catch can be deployed by a sharp rotation of the shank, to use centrifugal force to pivot the out-of-balance catch. To remove a vertical fastener, it may be necessary simply to undo the nut and push the fastener inwardly through the opening, allowing it to fall away on the far side.

The invention is useful in many applications, but because the fastener is capable of exerting high pressures between two elements without failure, it can be used where great structural strength is required, or where relatively heavy materials, such as thick steel sheets, are to be fastened together.

What is claimed is:

1. A fastener comprising a shank for extending through an opening from a near side to a far side of a wall; a catch formed by a plate retained in a slot extending diametrically through the solid shank of the fastener, the width of the plate being just less than the width of the slot, and the catch being swivel mounted on a pin extending across the slot in a fixed location on the shank whereby to have a first orientation in which the catch lies within the profile of the shank and a second orientation at right angles thereto in which opposite ends of the catch project beyond the profile of the shank on each side thereof, whereby the catch can pass through a suitably sized opening in the first orientation but the two ends of the catch are adapted each to engage the far side of the wall and prevent withdrawal of the shank from the opening in the second orientation; and means for tensioning the shank in the opening by reaction against the near side of the wall; wherein the catch has its centre of gravity offset from the pin whereby, when the shank is horizontal and the slot is in a first vertical orientation, the unimpeded catch will swivel from its first to its second orientation by means of gravity against an abutment in the shank to support the catch when the shank is tensioned, and when the shank is rotated to turn the slot to the opposite vertical orientation, the unimpeded catch will return from its second to its first orientation by mean of gravity.

2. A fastener according to claim 1 wherein the abutment is formed by a shoulder at one end of the slot.

3. A fastener according to claim 2 wherein the shoulder is rounded and concave and the corresponding abutment portion of the catch is curved to match.

4. A fastener according to claim 1 wherein the pin transmits negligible force when the fastener is tensioned with the catch in its second orientation.

5. A fastener according to claim 4 wherein the pin is of flexible and resilient plastics material.

6. A fastener according to claim 1 provided with marking whereby the orientation of the shank is indicated on an end of the shank directed, in use, towards the near side of the wall.

7. A fastener according to claim 1 wherein an end of the shank directed, in use, towards the near side of the wall is provided with a screwdriver slot.

8. A fastener according to claim 1 wherein the tensioning means comprises nut means in screw threaded engagement with the shank.

9. A fastener according to claim 1 wherein the catch is formed from a rectangular plate from which material has been removed whereby the centre of gravity of the catch is offset from the pivot axis in a direction both axially and radially of the shank when the catch is in its first orientation.

10. A fastener according to claim 9 wherein the greater part of the material has been removed from one corner of the original rectangle.

11. A fastener according to claim 10 wherein the pin passes through the centre of the original rectangle.

12. A fastener comprising an elongate shank having a trailing end and a leading end for extending through an opening from a near side to a far side of a wall; a catch formed by a plate retained in a slot extending diametrically through the shank of the fastener at a location between the leading and the trailing end, the shank being solid from the slot to the leading end, the width of the plate being just less than the width of the slot, and the catch being swivel mounted on a pin extending across the slot in a fixed location on the shank whereby to have a first orientation in which the catch lies entirely within the slot and within the profile of the shank and a second orientation at right angles thereto in which opposite ends of the catch project beyond the profile of the shank on each side thereof, whereby the catch can pass leading end first through a suitably sized opening in the first orientation but the two, opposite, ends of one edge of the catch each engage the far side of the wall and prevent withdrawal of the shank from the opening in the second orientation; and means for tensioning the shank in the opening by reaction against the near side of the wall; wherein the catch has its centre of gravity offset from the pin whereby, when the shank is horizontal and the slot is in a first vertical orientation, the unimpeded catch will swivel from its first to its second orientation by means of gravity against an abutment in the shank to support the catch when the shank is tensioned, and when the horizontal shank is subsequently rotated about its longitudinal axis to turn the slot to an opposite vertical orientation, the unimpeded catch will return solely by gravity from its second to its first orientation.

* * * * *